R. F. BOWER.
ROLLER BEARING.
APPLICATION FILED FEB. 8, 1909.
1,070,664.
Patented Aug. 19, 1913.
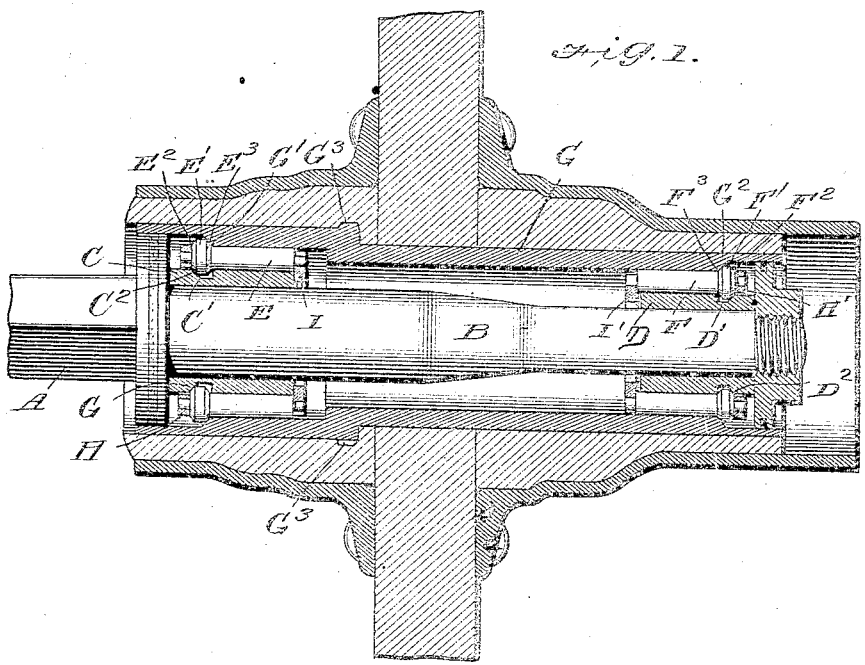
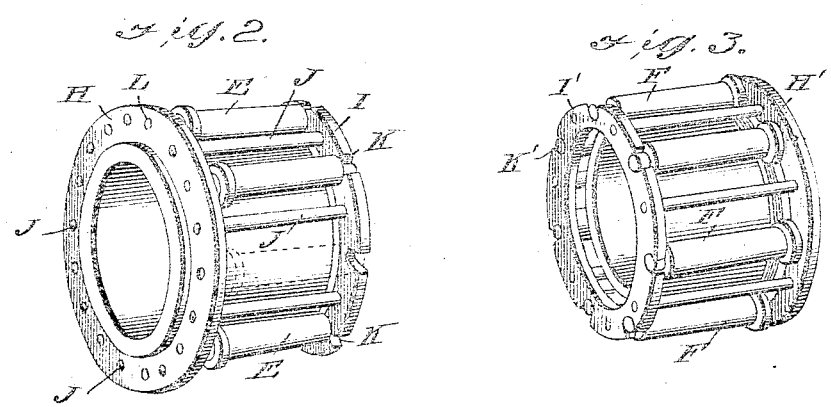
WITNESSES
H. E. Barry
Perry B. Turpin
INVENTOR
ROBERT F. BOWER
BY Munn & Co.
ATTORNEYS

UNITED STATES PATENT OFFICE.

ROBERT FRANKLIN BOWER, OF DAYTON, OHIO.

ROLLER-BEARING.

1,070,664.  Specification of Letters Patent.  Patented Aug. 19, 1913.

Application filed February 8, 1909. Serial No. 476,638.

*To all whom it may concern:*

Be it known that I, ROBERT FRANKLIN BOWER, a citizen of the United States, and a resident of Dayton, in the county of Montgomery and State of Ohio, have made certain new and useful Improvements in Roller-Bearings, of which the following is a specification.

The invention is an improvement in roller bearings and has for its object the obtaining of a construction which is effective both in sustaining radial loads and in taking care of end thrust.

It is a further object to provide a bearing which is readily insertible or removable from the structure in which it is used, and one in which the maximum amount of wearing surface is obtained within prescribed limits of dimensions.
Still another object is to overcome certain defects inherent in roller bearings as heretofore constructed, and with these objects in view the invention consists in the construction as hereinafter described and claimed.

In the drawings: Figure 1 is a vertical, longitudinal section of a bearing embodying my invention. Figs. 2 and 3 are detailed perspective views showing the removable rolls and one race member assembly.

In the specific construction shown by the drawings my improved bearing is applied to the hub and axle for a vehicle wheel in which (A) is the axle having a spindle (B) on which the inner race members (C) and (D) for two radial load sustaining bearings are placed. These race members are arranged respectively adjacent to the inner and outer ends of the hub and coöperate with rolls (E) and (F) and with outer annular race members, which latter as shown are formed in the box member (G) of the wheel hub. The race members (C) and (D) are provided with annular grooves (C') and (D'), the outer faces of which (C²) and (D²) are beveled as shown in Fig. 1. The rolls (E) and (F) have cylindrical portions which engage with the cylindrical portions of the race members and at one end are provided with enlargements (E') and (F') having oppositely beveled faces (E²) and (E³) and (F²) and (F³). The beveled faces (E²) and (F²) are of the same angle or complementary to the beveled faces (C²) and (D²), while the beveled faces (E³) and (F³) are of the same angle or complementary to beveled shoulders (G') and (G²) on the outer race member. Thus any end thrust is taken care of and is transmitted from the beveled face of one of the race members through the bevel faced enlargements of the rolls to the opposed face of the complementary race member. As the bearings at the opposite ends of the hubs are oppositely arranged end thrust in both directions is resisted.

The rollers are spaced about the inner race member by a suitable cage or retainer construction which is shown comprises rings (H) and (I) at opposite ends of the rolls. These rings engage pintles or trunnions at opposite end of the rolls, and as shown the ring (H) is apertured at (L) for engagement with said pintle, and the ring (I) is provided with outwardly opening slots (K) for lateral engagement of the pintles. The two rings are held in fixed relation to each other by rods (J) and when the rolls are engaged therewith and with the groove of the inner race member an assembly is formed, shown in Figs. 2 and 3, which may be inserted or withdrawn from the outer race member in the hub of the wheel.

With the construction as shown and described the radial load is sustained by the cylindrical portions of the rolls and the cylindrical race members with which they are engaged, and thus the bearing faces are at right angles to the direction of the load.
The end thrust is distributed through the series of bevel faced enlargements of the rolls and through the complementary beveled faces of the race members, and as the angles of all of the bevels are the same the resultant of the stresses will be parallel to the axis of the bearing. Furthermore the fact that the cylindrical portions on one race member is integral or rigid with the beveled face portion which engage the outer bevel faces of the rolls prevents the longitudinal displacement of said race. This counteracts any spiral thrust exerted by the rolls upon the race member.

I claim:
1. A roller bearing comprising a series of rolls each consisting of a cylindrical radial load bearing portion and an enlargement at one end having oppositely beveled end thrust faces, inner and outer concentric annular race members each having a radial load bearing portion engaging the cylin- drical portions of said rolls, and respectively having oppositely beveled end thrust bearings engaging the opposite beveled faces of the rolls.

2. A roller bearing comprising a series of rolls each consisting of a cylindrical radial thrust portion and an enlargement at one end having oppositely beveled end thrust surfaces in proximity to each other being spaced merely by the stock required to transmit the thrust; outer and inner parallel radial load bearing race members, the one having a beveled end thrust bearing for engagement with the inner beveled faces of said rolls and the other race member having integral therewith a beveled end thrust bearing for the outer beveled face of said rolls with an intermediate annular groove providing radial clearance for the enlargements of the rolls.

3. A roller bearing comprising an outer member having an inner cylindrical bearing face and a thrust bearing at one end thereof, an inner parallel sleeve member having an outer cylindrical bearing face and a beveled thrust bearing integral therewith, a series of rolls surrounding said sleeve each having a cylindrical portion engaging the cylindrical surface of said sleeve and an enlargement having a beveled face engaging the thrust bearing on said sleeve and an opposed beveled face for engaging the thrust bearing on said outer member, and a cage or retainer for holding said rolls in relation to said inner sleeve and forming therewith an organized unit engageable with and disengageable from said outer bearing.

4. A roller bearing comprising an inner cylindrical sleeve member having an annular groove in its outer face, one side of which is beveled, a series of rolls surrounding said sleeve, each having at one end an enlargement with opposite beveled faces engaging said groove and one of said faces bearing against the beveled face of the groove, a cage for holding said rolls in spaced relation to each other and forming with said sleeve an organized unit, and an outer bearing member having a beveled end thrust bearing opposed to the bevel bearing face of said sleeve.

5. A roller bearing comprising a series of rolls each having a cylindrical portion and an enlarged head at one end provided with oppositely beveled end thrust faces, an annular race member having a cylindrical face with which the cylindrical portions of said rolls engage, and a beveled face complementary to the inner beveled faces of said rolls, and a second annular race member having a cylindrical face engaging cylindrical portions of said rolls, a beveled face engaging the outer beveled faces of said rolls, and an integral connection between said outer beveled face portion and said cylindrical portion of the last mentioned race member grooved to provide peripheral clearance for the enlarged ends of said rolls.

6. A roller bearing comprising an annular outer race member having a cylindrical face and an outwardly extending beveled portion at one end of said cylindrical face, a concentric inner annular race member having a cylindrical portion opposite the cylindrical portion of said outer member, a grooved portion adjacent to said cylindrical portion and a portion beyond said grooved portion having a beveled face opposed to that on the first mentioned member, and a series of rolls surrounding said inner race member having cylindrical portions for engaging the cylindrical portions of said race member and an enlarged head at one end having oppositely beveled faces complementary to the beveled faces of said race members and interposed therebetween to transmit end thrust from the one race member to the other, the beveled face of one race member also forming an anchor for holding the cylindrical portion of said race member from endwise movement under the spiral thrust of said rolls.

7. A roller bearing comprising a series of rolls each having a cylindrical portion and an enlargement at one end thereof having oppositely beveled faces, parallel outer and inner annular race members having cylindrical portions engaging the cylindrical portions of said rolls, one of said race members having a beveled portion complementary to and engaging the inner beveled faces of said rolls and the other race member having an oppositely beveled portion complementary to and engaging the outer beveled faces of said rolls and an integral connecting portion between said outer beveled face portion and said cylindrical portion of said last mentioned race member grooved to provide peripheral clearance for the enlargements of said rolls.

ROBERT FRANKLIN BOWER.

Witnesses:
 FERNE A. BUSHONG,
 FRANK L. SCHUSTER.